United States Patent [19]

Uchino et al.

[11] Patent Number: 4,517,636
[45] Date of Patent: May 14, 1985

[54] INVERTER APPARATUS

[75] Inventors: Hiroshi Uchino, Hachiouji; Kihei Nakajima, Yokohama; Ryoichi Kurosawa, Hachiouji, all of Japan

[73] Assignee: Tokyo Shibaura Denki Kabushiki Kaisha, Japan

[21] Appl. No.: 512,004

[22] Filed: Jul. 8, 1983

[30] Foreign Application Priority Data

Jul. 9, 1982 [JP] Japan .................. 57-119522
Jul. 9, 1982 [JP] Japan .................. 57-119523

[51] Int. Cl.³ .......................................... H02M 7/515
[52] U.S. Cl. ........................... 363/138; 363/79; 363/96
[58] Field of Search ......... 363/27, 79, 96, 135, 363/136, 137, 138; 318/803, 807, 811

[56] References Cited

U.S. PATENT DOCUMENTS 3,824,437 7/1974 Blaschke ............... 318/803

FOREIGN PATENT DOCUMENTS 877783 10/1981 U.S.S.R. ................. 363/96

OTHER PUBLICATIONS

Sakurai et al., "The 5,000 kw Thyristor Motor Ranking Among the World's Largest Units," Toshiba Review, vol. 33, No. 10, pp. 865-870 (1978).

Primary Examiner—William H. Beha, Jr.
Assistant Examiner—Anita M. Ault
Attorney, Agent, or Firm—Finnegan, Henderson, Farabow, Garrett & Dunner

[57] ABSTRACT

An inverter apparatus includes a plurality of gate-turn-off thyristors being provided at each end of thyristor-branches, and bias sources or capacitors connected in parallel with the gate-turn-off thyristors for applying reverse voltage to the thyristor-branches when the gate-turn-off thyristor is turned off.

3 Claims, 6 Drawing Figures

INVERTER APPARATUS

BACKGROUND OF THE INVENTION

This invention relates to an inverter apparatus for converting direct current electric power into alternating current electric power, and more particularly to an inverter apparatus for improving the operation frequency boundary.

FIG. 1 is a schematic diagram illustrating a power inverter apparatus wherein an example of a well-known brushless motor application is shown. Reference numeral 10 represents a DC power source to provide the output current $I_D$. Power inverter 11 includes thyristor-branches UP, VP, WP, UN, VN and WN connected in a bridge configuration. A DC reactor 12 absorbs ripple voltages of the DC power source 10 and the power inverter 11 to smooth the DC current $I_D$. A synchronous motor 13 is provided with an armature winding 14 and a field winding 15. A position detector 16 detects the angle of revolution of synchronous motor 13. Reference numeral 17 represents a triggering control circuit that controls triggering thyristor-branches UP, VP, WP, UN, VN and WN in accordance with the output signals from position detector 16.

FIG. 2 is a waveform diagram illustrating the operation of the power inverter apparatus shown in FIG. 1. In FIG. 2, $E_U$, $E_V$, and $E_W$ represent the induced voltages of the respective phases U, V and W of synchronous motor 13, and $I_U$, $I_V$ and $I_W$ respectively represent the currents of phases U, V and W of synchronous motor 13. The operation of the power inverter of FIG. 1 will next be described when the commutation is such that first the thyristor-branches UP and WN are in a conductive state and then the thyristor-branch VP is conductive. In FIG. 2, a triggering pulse is supplied to the thyristor-branch VP at time t1. Since the voltage $E_U$ is greater than the voltage $E_V$ at time t1, a voltage of $(E_U - E_V)$ is applied to the thyristor-branch VP as a forward voltage, so that the thyristor-branch VP will be turned on. At the same time, a current shown by a dotted arrow A in FIG. 1 flows. Consequently, the current $I_U$ decreases, in turn, the current $I_V$ increases. At time t2, when the current $I_U$ becomes zero, the thyristor-branch UP will be turned off. At this instant, since the voltage $E_U$ is greater than the voltage $E_V$, a voltage of $(E_U - E_V)$ is applied to the thyristor-branch UP as a reverse voltage. At time t3, when the voltage $E_U$ becomes equal to the voltage $E_V$, the reverse voltage applied to the thyristor-branch UP becomes zero, and thereafter the voltage applied to the thyristor-branch UP is reversed in polarity. The forward voltage is applied to the thyristor-branch UP. Therefore, it is necessary that the thyristor-branch UP should completely be turned off by time t3 so that the capability of forward voltage blocking has been recovered. This requires that the period between the times t3 and t2 should be greater than the turn-off time of a thyristor element.

Greater capacities and higher speeds over such prior circuits are now desirable. For example, there is a need for a compressor conventionally driven by a gas turbine to be substituted with a brushless motor provided with features such as simplified operation, easier maintenance, high efficient and economical performance, and superior control characteristics. In such applications, a brushless motor must be provided with both greater capacities and higher speeds, such for instance as 30,000 kW and 6,000 RPM or 10,000 kW and 9,000 RPM and further to be operated at higher voltages such as from 3 kV up to 14 kV. This necessitates a power inverter apparatus capable of generating higher voltages with greater power capacities and higher frequencies.

In general, thyristor elements tend to have long turn-off times when provided with characteristics of higher voltages and greater current capacities, and so no high speed thyristor suitable for such applications has been developed. For instance, in the case of a thyristor of 4 KV both in peak repetitive off-voltage and in peak repetitive reverse voltage with average on-current of 1,500 A, the turn-off time is approximately 400 $\mu$sec. Here, a thyristor having a turn-off time of less than 250 $\mu$sec. is specifically selected for use and will be described below.

In FIG. 2, it is desirable to minimize the electrical angle from time t2 to time t3 so as to enhance the power factor of synchronous motor 13 and to decrease the torque ripples. For example, the case when the time t2 to time t3 is controlled to 15° or less will be described. The turn-off time of a thyristor element is 250 $\mu$sec. By taking variations of control into consideration, if the period from time t2 to time t3 is controlled to a target of more than 500 $\mu$sec, the minimum value of the period $T_1$ at the output side of inverter 11 is expressed as follows:

$$T_1 = 500 \ \mu\text{sec} \times 360°/15° = 12000 \ \mu\text{sec} = 12 \ \text{msec} \quad (1)$$

therefore, the maximum value $f_1$ of the output frequency will be $$f_1 = 1000/12 = 83.3 \ \text{Hz} \quad (2)$$

Therefore, the number of revolutions of the brushless motor is limited to 2500 RPM in case of a four-pole machine or to 5000 RPM even in case of a two-pole machine. An appropriate speed-increasing gear mechanism is required to obtain necessary higher speeds. However, a speed-increasing gear mechanism designed for greater capacities and higher speed revolutions has many difficulties in manufacturing, so that the use of a brushless motor for such applications has inevitably been limited.

SUMMARY OF THE INVENTION

It is therefore an object of this invention to provide a power inverter apparatus capable of generating higher voltages, greater current capacities and higher frequencies.

According to this invention, an inverter apparatus comprises an inverter including thyristor-branches, the inverter being connected across a DC power source, a plurality of gate turn-off thyristors interposed between the DC power source and each of the thyristor-branches, a load connected to AC terminals of the inverter, gate control means for applying gate turn-off signals to the gate-turn-off thyristors, means for detecting current through the AC terminals of the inverter and applying output signals to the gate control means when the current is a predetermined value and means for biasing a reverse voltage to the thyristor-branches when the gate-turn-off thyristors are turned off.

DETAILED DESCRIPTION OF THE INVENTION

Figure 1:
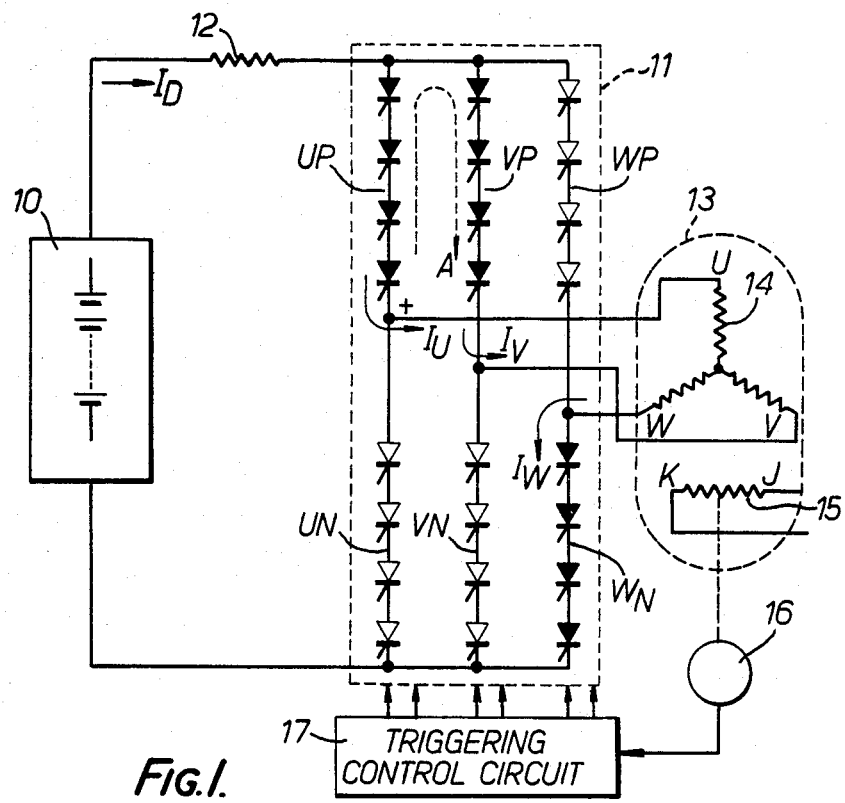
FIG. 1 is a schematic diagram showing a conventional apparatus.
Figure 2:
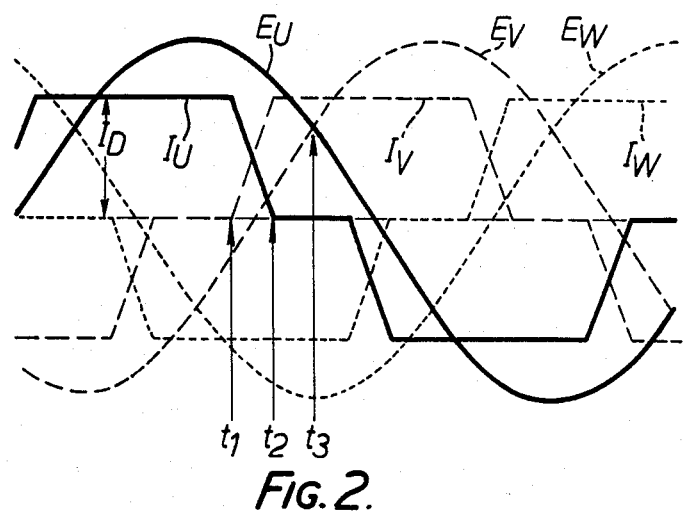
FIG. 2 is a waveform diagram for explaining the operation of the conventional apparatus.
Figure 3:
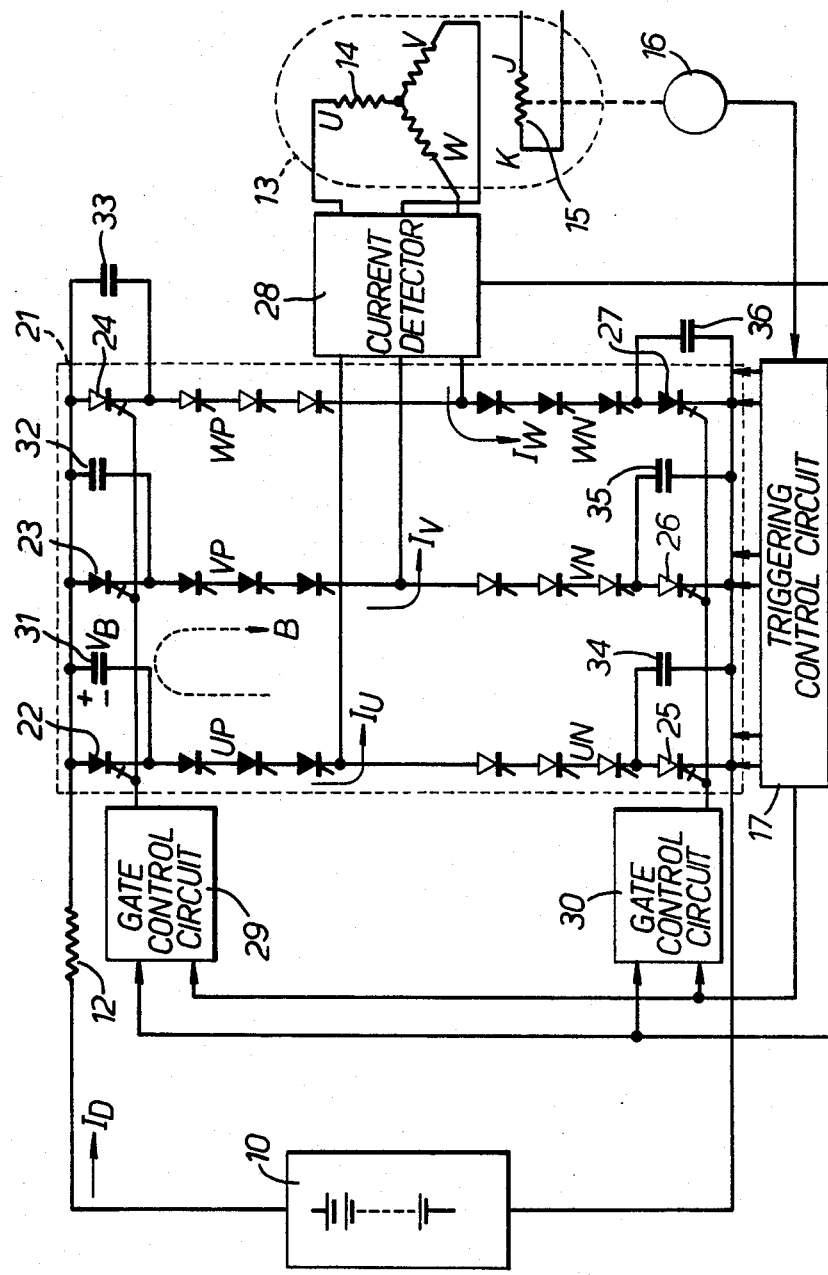
FIG. 3 is a schematic diagram showing one embodiment according to this invention.

One embodiment according to this invention is shown in FIG. 3 wherein similar parts as shown in FIG. 1 are designated by like reference numerals.

Referring to FIG. 3, in an inverter 21, reference numerals 22 through 27 represent gate-turn-off thyristors (which are hereinafter referred to as "GTO"). GTOs 22, 23 and 24 are respectively connected between thyristor-branches UP, VP, WP and one terminal of DC reactor 12. GTOs 25, 26 and 27 are respectively connected between thyristor-branches UN, VN, WN and DC power source 10. A current detector 28 detects the instantaneous values of the currents $I_U$, $I_V$ and $I_W$. A gate control circuit 29 supplies the gating signals to the gates of each of GTOs 22, 23 and 24 respectively. A gate control circuit 30 supplies the gating signals to the gates of each of GTOs 25, 26 and 27 respectively. Capacitors 31 through 36 are connected in parallel with the respective GTOs 22 through 27.

Figure 4:
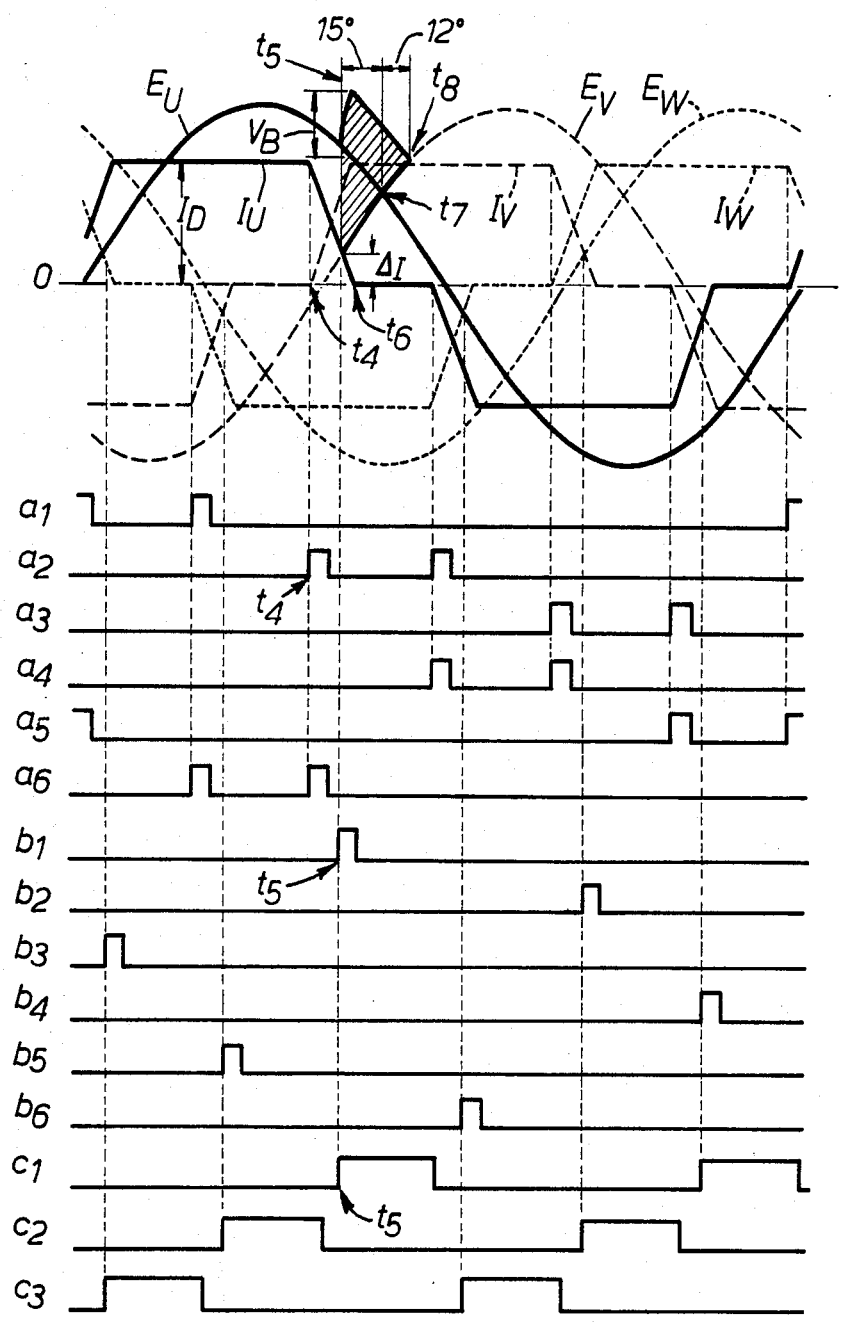
FIG. 4 is a waveform diagram for explaining the operation of the embodiment as shown in FIG. 3.

The operation will next be described in detail with reference to FIG. 4. Referring to FIG. 4, reference characters $E_U$, $E_V$ and $E_W$ represent the induced voltages of the respective phases U, V and W of synchronous motor 13 of FIG. 3, and $I_U$, $I_V$ and $I_W$ the respective phase currents of the phases U, V and W of synchronous motor 13. Signals a1 through a6 are on-pulse signals to be applied to the respective thyristors of thyristor-branches UP, VP, WP, UN, VN and WN and GTOs 22 through 27. Signals $b_1$ through $b_6$ are off-pulse signals to be applied to the respective GTOs 22 through 27. Logic level signals $c_1$, $c_2$ and $c_3$ indicate when the respective currents $I_U$, $I_V$ and $I_W$ reach values less than a predetermined value. Current detector 28 supplies logic signals $c_1$, $c_2$ and $c_3$ to gate control circuits 29 and 30.

The operation will now be described when commutation causes the thyristor-branches UP and WN first to be in a conductive state and then the thyristor-branch VP to be conductive. At time $t_4$ in FIG. 4, when the on-pulse signal a2 is supplied to the thyristor-branch VP, since the voltage $E_U$ is greater than the voltage $E_V$ at this instant, a voltage of $(E_U - E_V)$ is applied to the thyristor-branch VP as a forward voltage. The thyristor-branch VP is thereby turned on. At the same time, a current shown by dotted arrow B in FIG. 3 flows in thyristor-branches UP and VP. Consequently, the current $I_U$ decreases to a value near zero, and $\Delta I$, the signal $c_1$ from current detector 28, is changed from a "0" to a "1" in logical state. The change in the signal $c_1$ is converted into a pulse by means of gate control circuit 29 so that the off-pulse signal $b_1$ is supplied to GTO 22. When a negative pulse current is supplied, by virtue of the off-pulse signal $b_1$, to the gate of GTO 22, GTO 22 is turned off within a period of 10 to 20 μsec, and its capability to block a forward voltage is recovered.

Therefore, capacitor 31 is charged by the current $I_U$ in the polarity shown in FIG. 3. At time $t_6$, when the current $I_U$ becomes zero, the capacitor 31 is charged to a voltage of $V_B$, which can be adjusted according to the capacitance of capacitor 31 or the value of $\Delta I$ as shown in FIG. 4. The voltage $V_B$ is applied to the ordinary thyristors of thyristor-branch UP as a reverse voltage, and a reverse voltage of $(E_U - E_V + V_B)$ is applied to the ordinary thyristor as shown in hatching of FIG. 4. Thus, at a time $t_7$, even after the voltage $E_U$ becomes equal to the voltage $E_V$, the reverse voltage $V_B$ is applied to the ordinary thyristors of the thyristor-branch UP. At time $t_8$, only after a voltage of $(E_V - E_U)$ becomes equal to the voltage $V_B$, the reverse voltage applied to the ordinary thyristor of the thyristor-branch UP becomes zero. Where proportional voltage across the GTOs and the ordinary thyristors of the respective thyristor-branches are in the ratio of 1:4, and the voltage of $V_B$ is determined to be 20% of the voltage of $(E_V - E_U)$, a reverse voltage is applied to the ordinary thyristors until the time when the voltage $(E_V - E_U)$ increases up to the 20% of the maximum voltage $(E_V - E_U)$. Accordingly, there is no problem if the ordinary thyristor recovers its capability of forward voltage blocking within the period from one time $t_6$ to the time $t_8$.

The electrical angle from time $t_7$ to time $t_8$ is $\sin^{-1} 0.2 \approx 12°$. Therefore, assuming that an electrical angle from time $t_5$ to time $t_7$ is controlled at 15° as in the manner described for the conventional apparatus, the electrical angle from the time $t_5$ to time $t_8$ becomes $12° + 15° = 27°$.

Figure 5:
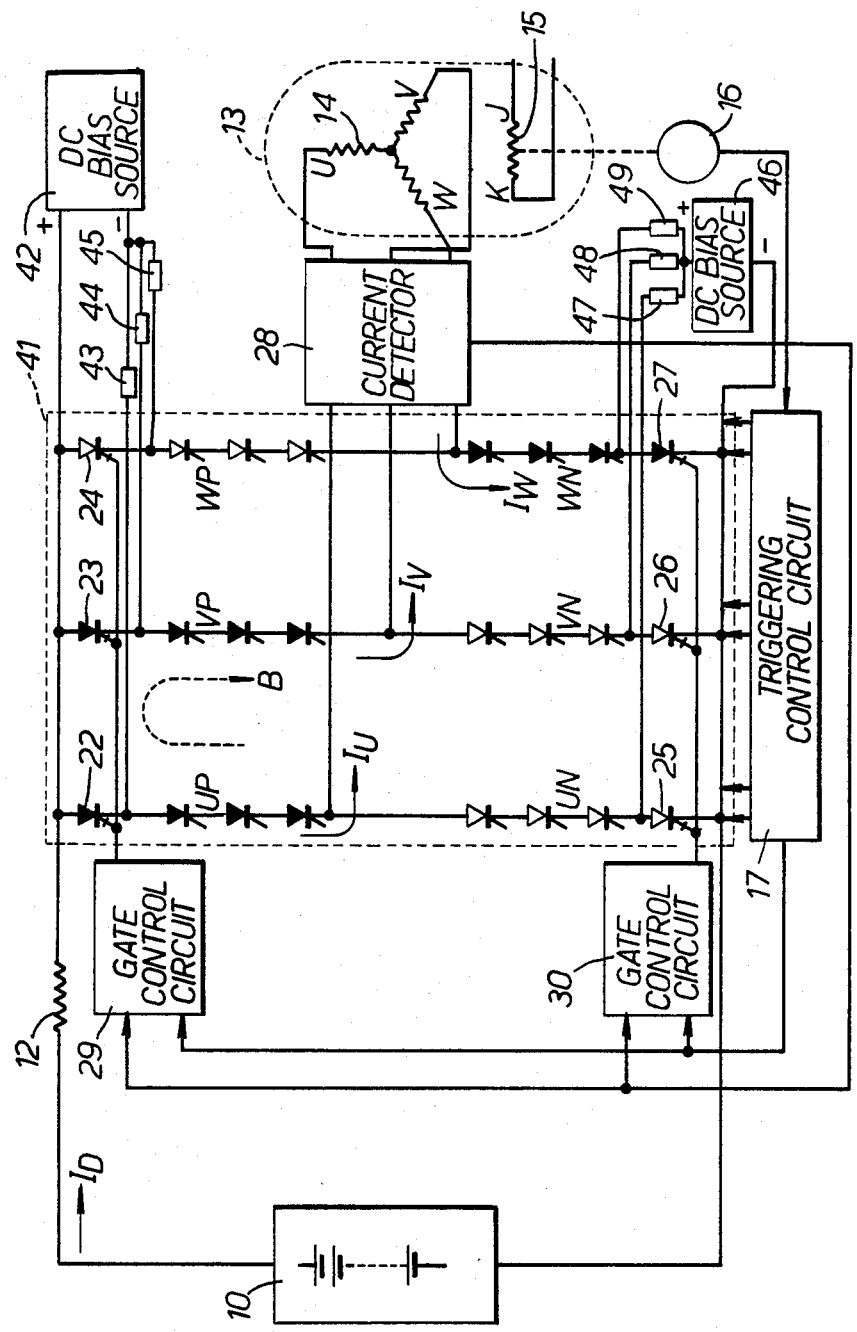
FIG. 5 is a schematic diagram showing another embodiment according to this invention.

Another embodiment according to this invention is shown in FIG. 5 wherein similar parts as shown in FIGS. 1 and 3 are designated by like reference numerals.

Referring to FIG. 5, the ordinary thyristors of thyristor-branches UP, VP and WP in an inverter 41 are biased by a DC bias source 42 through resistors 43, 44 and 45 respectively. A DC bias source 46 applies a DC voltage to the ordinary thyristors of thyristor-branches UN, VN and WN through resistors 47, 48 and 49.

The operation of the FIG. 5 embodiment will next be described in detail with reference to FIG. 6 wherein similar signals as shown in FIG. 4 are designated by like reference symbols. The operation when the commutation is such that the thyristor-branches UP and WN are first conductive and then the thyristor-branch VP is conductive is similar to the embodiment of FIG. 3.

Figure 6:
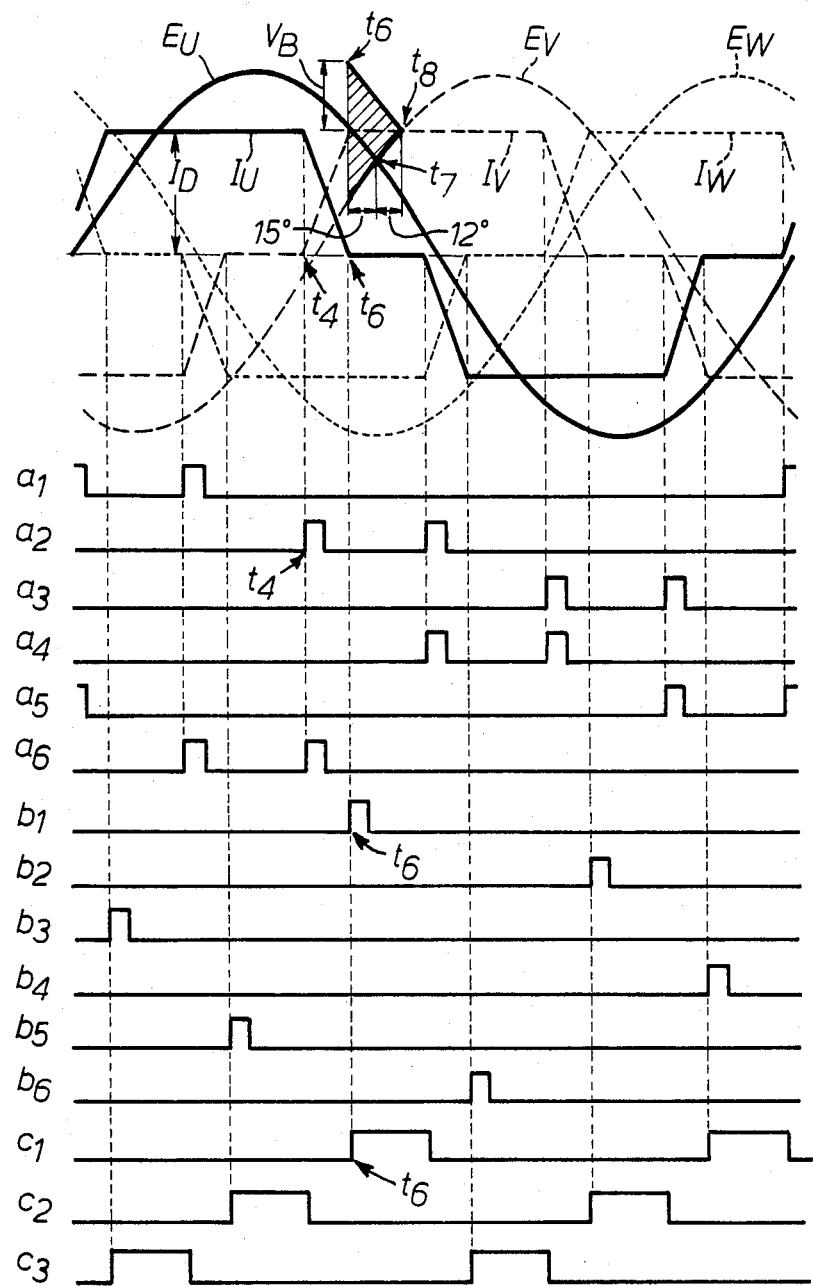
FIG. 6 is a waveform diagram for explaining the operation of the embodiment as shown in FIG. 5.

At time $t_4$ in FIG. 6 the on-pulse signal a2 is supplied to thyristor-branch VP. Since the voltage $E_U$ is greater than the voltage $E_V$ at this instant, a voltage of $(E_U - E_V)$ is applied to the thyristor-branch VP as forward voltage, so that the thyristor-branch VP is turned on. At the same time, a current shown by dotted arrow B in FIG. 5 flows in thyristor-branches UP and VP. Consequently, the current $I_U$ decreases and the current $I_V$ increases. At time $t_6$, when the current $I_U$ becomes zero, the logic signal $c_1$ from current detector 24 changes from a "0" to a "1" in logical state. The change in the signal $c_1$ is converted into a pulse by means of gate control circuit 29 so that the off-pulse signal $b_1$ is supplied to GTO 22. When a negative pulse current is supplied, by virtue of the off-pulse signal $b_1$, to the gate of GTO 22, GTO 22 is turned off within a period of 10 to 20 μsec, and its capability to block a forward voltage is recovered. This causes a bias voltage of DC bias source 42 to be applied through resistor 43 to the GTO 22 in a forward direction. The magnitude of this forward voltage is, hereinafter, referred to as $V_B$. The voltage $V_B$ is applied to the ordinary thyristor of the thyristor-branch UP as a reverse voltage, and this results in a reverse voltage of $(E_U-E_V+V_B)$ being applied to the ordinary thyristors as shown in the hatching of FIG. 6. Thus, at time $t_7$, even after the voltage $E_U$ has become equal to the voltage $E_V$, the ordinary thyristor of the thyristor-branch UP still receives the reverse voltage of $V_B$. At time $t_8$, only after the voltage $(E_V-E_U)$ becomes equal to the voltage $V_B$, the reverse voltage applied to the ordinary thyristor of the thyristor-branch UP becomes zero.

When the proportional voltages across the GTOs and the ordinary thyristors of the respective thyristor-branches are in the ratio of 1:4, and the voltage of $V_B$ is determined to be 20% of the voltage of $(E_V-E_U)$, a reverse voltage is applied to the ordinary thyristors until the time when the voltage $(E_V-E_U)$ increases up to the 20% of the maximum voltage $(E_V-E_U)$. Accordingly, there is no problem if the ordinary thyristor recovers its capability of forward voltage blocking within the period from time $t_6$ to time $t_8$.

The electrical angle from time $t_7$ to time $t_8$ is $\sin^{-1}0.2 \approx 12°$. Assuming that an electrical angle from time $t_6$ to time $t_7$ is controlled at 15° as for the above described conventional apparatus, the electrical angle from the time $t_6$ to the time $t_8$ becomes $12°+15°=27°$.

Therefore according to this invention, assuming that a thyristor element of less than 250 μsec in turn-off time is utilized as the ordinary thyristor, the period from time $t_5$ to time $t_8$ in the first embodiment (time $t_6$ to time $t_8$ in the second embodiment) is controlled, at a target of more than 500 μsec as in the same manner as described for the conventional apparatus. The minimum value of the period $T_2$ at the output side of inverter may be obtained as follows:

$$T_2 = 500 \text{ μsec} \times 360°/27° = 6667 \text{ μsec} = 6.667 \text{ msec} \quad (3)$$

Therefore, the maximum value $f_2$ of the output frequency can be expressed as follows:

$$f_2 = 1000/6.667 = 150 \text{ Hz} \quad (4)$$

Accordingly, the number of revolutions of the brushless motor will be 4500 RPM in the case of a four-pole machine, and 9,000 RPM in the case of a two-pole machine.

In the conventional method, as described above the brushless motors were limited to 2500 RPM in a four-pole machine, and 5,000 RPM in a two-pole machine, so that a speed-increasing gear mechanism was needed to obtain an increased number of revolutions. However, as before stated, such a speed-increasing gear mechanism presents many difficulties to manufacture. Consequently, a gas turbine has inevitably been utilized instead of such a gear mechanism.

By contrast, according to the present invention, it is possible to utilize a brushless motor provided with such features as simplified operation, easier maintenance, high efficient and economical performance, and superior control characteristics. The above description has been made regarding the case when the GTOs with self turn-off capability are utilized as a thyristor provided with forced commutation function, however, other well-known forced commutation circuits may also be used. In those embodiments, a synchronous motor is connected as the load of the power inverter apparatus according to the present invention to constitute a brushless motor. The power inverter apparatus of the present invention may also be adapted for many other applications as a DC-AC inverter apparatus capable of operating at higher frequencies with both higher voltages and greater power capacities. According to this invention, the marginal angle of commutation can be reduced in the power inverter apparatus, so that operations with an enhanced power factor can also be achieved.

What is claimed is:

1. A D.C. to A.C. inverter apparatus responsive to a D.C. power source comprising:
   an inverter including thyristor-branches, said inverter being connected across the DC power source;
   a plurality of gate-turn-off thyristors respectively interposed between the DC power source and each of the thyristor-branches;
   a load connected to the output terminals of said inverter;
   gate control means for applying gate turn-off signals to said gate-turn-off thyristors;
   means for detecting current through the output terminals of said inverter and applying control signals to said gate control means when the detected current is a predetermined value; and
   means for biasing a reverse voltage to the thyristor-branches when said gate-turn-off thyristor is turned off.

2. The inverter apparatus according to claim 1, wherein said biasing means includes a plurality of capacitors, each of said capacitors being respectively connected in parallel with one of said plurality of gate-turn-off thyristors.

3. The inverter apparatus according to claim 1, wherein said biasing means includes a plurality of DC bias sources, each being respectively connected across one of said plurality of said gate-turn-off thyristors.

* * * * *